May 8, 1928.
F. H. SHERRERD
1,668,823
EXPANSION JOINT FOR CONCRETE PIPE
Filed June 18, 1926
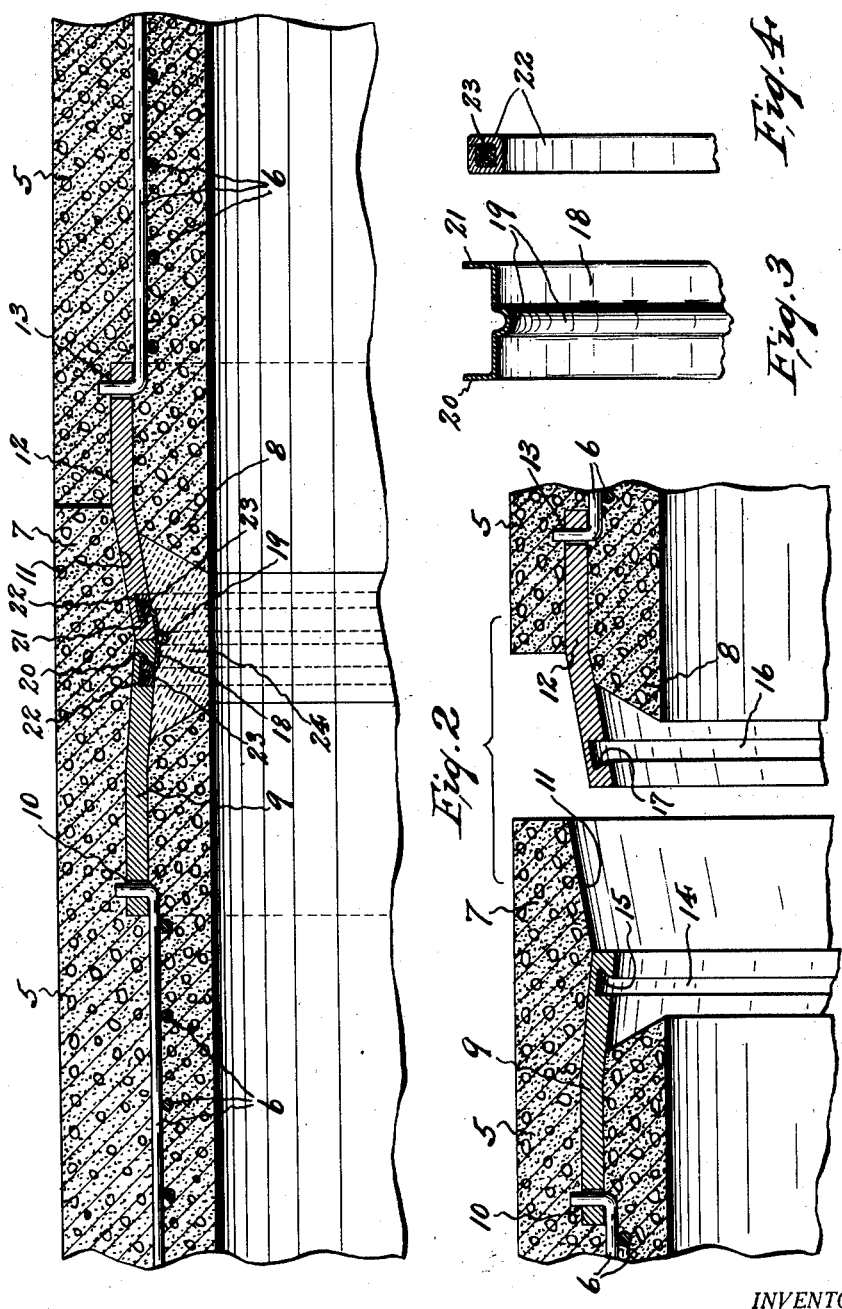
INVENTOR.
Francis H. Sherrerd,
BY
Fraentzel and Richards,
ATTORNEYS.

Patented May 8, 1928.

1,668,823

UNITED STATES PATENT OFFICE.

FRANCIS H. SHERRERD, OF EAST ORANGE, NEW JERSEY, ASSIGNOR TO NEWARK CONCRETE PIPE CO., OF NEWARK, NEW JERSEY, A CORPORATION OF NEW JERSEY.

EXPANSION JOINT FOR CONCRETE PIPE.

Application filed June 18, 1926. Serial No. 116,916.

This invention relates, generally, to an improved expansion joint for concrete pipe or conduit.

It is the object of this invention to provide in connection with reenforced concrete pipe of the bell and spigot type, a novel construction of leak-proof expansion joint including an extensible sealing element adapted to permit relative longitudinal movement of the adjoined ends of adjacent pipe sections under stresses of expansion and contraction, together with a novel means to provide a leak-proof coupling or anchoring connection of said extensible sealing element with said adjoined pipe ends.

The present invention is illustrated in the accompanying drawings, in which:—

Figure 1 is a fragmentary longitudinal section through the abutting or adjoined ends of adjacent pipe sections equipped with the novel leak-proof expansion joint made according to and embodying the principles of this invention.

Figure 2 is a similar longitudinal section of adjacent pipe sections separated one from the other, the extensible element being removed.

Figure 3 is a fragmentary transverse sectional view of the extensible element of the novel joint structure drawn on an enlarged scale; and Figure 4 is a similar fragmentary transverse sectional view of a packing element used in connection with the novel joint structure.

Similar characters of reference are employed in all of the hereinabove described views, to indicate corresponding parts.

In the drawings, the reference character 5 indicates adjacent pipe or conduit sections made of concrete, the same being suitably reenforced by annular and longitudinal reenforcing metallic elements 6; or if desired, and particularly in connection with concrete pipe adapted for high pressure work, tubular metallic shells or cores may be imbedded in the concrete walls of the pipe or conduit, all in the manner already well known and familiar to those skilled in the art to which this invention refers.

In the embodiment of my invention, as shown in the accompanying drawings, each pipe or conduit section is provided at one end with a bell-portion 7 and at the other end with a spigot-portion 8 to fit telescopically into the bell-portion of an adjacent pipe conduit section.

Imbedded in the bell end of the pipe or conduit section 4 is an annular cast-iron or steel shell or collar 9, the interior end of which is imbedded in the pipe or conduit body and suitably connected with the reenforcing elements 6 as at 10, or with the reenforcing tubular metallic cores when such are employed, all in any convenient or suitable manner familiar to those skilled in the art. The exterior end of the annular shell or collar 9 projects into the mouth of the bell-portion 7 so as to line the same, but terminates short of the outer end of said bell-portion 7 so as to provide a free portion of the latter, the internal side of which is outwardly flared or inclined, as at 11, from the outer end of said shell or collar 9 toward the extremity of said bell-portion 7.

Imbedded in the spigot end of the pipe or conduit section 4 is an annular cast-iron or steel shell or collar 12, the interior end of which is imbedded in the pipe or conduit body and also suitably connected with the reenforcing elements 6, as at 13, or with the reenforcing tubular metallic cores when such are employed, all in any convenient or suitable manner familiar to those skilled in the art. The exterior end of said shell or collar 12 projects freely beyond the spigot end of the pipe or conduit section, and the same is tapered toward its free end to correspond to and fit the flared mouth 11 of the bell end of an adjacent pipe section when opposed and adjoined to the latter.

When two pipe or conduit sections are joined together, by interconnecting opposed bell and spigot ends thereof, the outer extremities of the annular shells or collars 9 and 12 will be brought into abutting relation one with the other, as shown in Figure 1 of the drawings.

The shell or collar 9 of one pipe end is provided at its interior side, adjacent to its free outer extremity, with an annular channel or groove 14, the outward side wall of which is undercut, as at 15. In like manner, the shell or collar 12 of the opposed pipe end is likewise provided at its interior side, adjacent to its free outer extremity, with a similar annular channel or groove 16, the outward side wall of which is undercut as at 17.

The reference character 18 indicates an annular sheet metallic sealing element, provided intermediate its sides with a yieldable fold or loop 19, whereby said sealing element is extensible and contractable in the direction of the axis of the pipe or conduit. Integrally connected with the respective side margins of said sealing element are annular anchor flanges 20 and 21. Said sealing element may be made of any suitable sheet metal, but is preferably made of lead, copper or similar not easily corroded metal.

After the adjacent pipe sections are engaged together by the interconnection of their adjoining bell and spigot ends, and the extremities of the respective shells or collars 9 and 12 are abutted together, said sealing element 18 is disposed over the joint intermediate said abutting extremities of the shells or collars 9 and 12, with its anchor flanges 20 and 21 entered respectively in the channels or grooves 14 and 16. When the parts are thus assembled together a suitable packing gasket is calked into each channel or groove 14 and 16, thereby not only bending the anchor flanges 20 and 21 of the sealing element 18 beneath the undercut sides 15 and 17 of said respective channels or grooves so as to lock said sealing element 18 against displacement from operative assembled relation, but also thus forming tight leak-proof joints intermediate said sealing element 18 and the respective shells or collars 9 and 12. The said packing gaskets may be variously made, preferably, however, the same consist in a tubular shell 22 of soft malleable metal, e. g. lead, provided with an internal fibrous core 23; such form of gasket being readily deformed in calking to conform to the cross-sectional shape of the grooves or channels 14 and 16, while at the same time tending to retain the shape or conformation wrought therein by the tamping or calking operations.

The ends of the pipe or conduit sections within the collars or shells are undercut, so that an internal recess is provided into which mortar or cement filling 24 is filled after the joint has been completed in the manner above described.

As will be understood from the above description, and by an inspection of Figure 1 of the drawings, the completed joint structure is not only leak-proof and capable of withstanding considerable pressure, but such leak-proof qualities will not be disturbed by relative movement of the adjoining pipe ends due to expansion or contraction, settling or other causes developed under conditions of use, since the yieldable fold or loop 19 of the anchored and calked sealing element 18 will by expansion or contraction permit such relative movements without risk of opening up the joints.

It will also be understood that various modifications of the pipe and of the joint structure hereinabove described may be made without departing from the scope of my invention as set forth in the following claims.

I claim:—

1. A leak proof expansion joint for concrete pipes, comprising metallic collars imbedded respectively in the abutting ends of adjoining pipe sections, the outer extremities of said collars being adapted to abut when said pipe sections are joined together, each collar having an annular groove adjacent to its outer extremity, an extensible metallic sealing element extending over the joint formed by the abutting extremities of said collars, said sealing element having anchoring means at opposite sides thereof engaged respectively in the grooves of said collars, and packing means calked into said grooves to both secure and seal the connection of said sealing element anchoring means with said collars.

2. A leak-proof expansion joint for concrete pipes, comprising metallic collars imbedded respectively in the abutting ends of adjoining pipe sections, the outer extremities of said collars being adapted to abut when said pipe sections are joined together, said abutting ends of said pipe sections being cut away to provide an annular recess in which the abutting extremities of said collars are exposed, each collar having an annular groove adjacent to its outer extremity opening into said recess, an extensible metallic sealing element extending over the joint formed by the abutting extremities of said collars, said sealing element having anchoring means at opposite sides thereof engaged respectively in the grooves of said collars, packing means calked into said grooves to both secure and seal the connection of said anchoring means with said collars, and a cement filling in said recess over said sealing element.

3. A leak-proof expansion joint for concrete pipes, comprising metallic collars imbedded respectively in the abutting ends of adjoining pipe sections, the outer extremities of said collars being adapted to abut when said pipe sections are joined together, each collar having an annular groove adjacent to its outer open extremity, each said groove having an undercut outward side wall, an annular sheet metal sealing element having a medial annular fold to render said element longitudinally expansible, said sealing element being further provided at its respective sides with annular anchor flanges respectively engaged in said grooves of said collars when said sealing element is disposed to cover the joint intermediate the abutting ends of said collars, and packing means calked into said grooves to deform said anchor flanges beneath the undercut outward sides of said grooves to both secure and seal the operative connection of said sealing element with said collars.

4. A leak-proof expansion joint for concrete pipes, comprising metallic collars imbedded respectively in the abutting ends of adjoining pipe sections, the outer extremities of said collars being adapted to abut when said pipe sections are joined together, said abutting ends of said pipe sections being cut away to provide an annular recess in which the abutting extremities of said collars are exposed, each collar having an annular groove adjacent to its outer open extremity, each said groove having an undercut outward side wall, an annular sheet metal sealing element having a medial annular fold to render said element longitudinally expansible, said sealing element being further provided at its respective sides with annular anchor flanges respectively engaged in said grooves of said collars when said sealing element is disposed to cover the joint intermediate the abutting ends of said collars, packing means calked into said grooves to deform said anchor flanges beneath the undercut outward sides of said grooves to both secure and seal the operative connection of said sealing element with said collars, and a cement filling in said recess over said sealing element.

5. A leak-proof expansion joint for the abutting ends of adjoining concrete pipe sections, comprising metallic collars respectively imbedded in said pipe ends so as to abut together endwise, each collar having an annular groove adjacent to its free end, an annular sheet metal member having a medial fold to render the same longitudinally expansible and side flanges to respectively engage in the grooves of the respective abutting ends of said collars so that said sheet metal member covers the joint intermediate the abutting ends of the latter, and packing elements calked into said grooves against said flanges entered therein to both secure and seal said metallic member in interconnecting relation to and between said collars.

6. A leak-proof expansion joint for the abutting ends of adjoining concrete pipe sections, comprising metallic collars respectively imbedded in said pipe ends so as to abut together endwise, each collar having an annular groove adjacent to its free end, an annular sheet metal member having a medial fold to render the same longitudinally expansible and side flanges to respectively engage in the grooves of the respective abutting ends of said collars so that said sheet metal member covers the joint intermediate the abutting ends of the latter, the outward side wall of each collar groove being undercut, and a packing element calked into said grooves against said flanges to bend and seal the same against and beneath said undercut side walls of said collar grooves.

7. A leak-proof expansion joint for the abutting ends of adjoining concrete pipe sections, comprising metallic collars respectively imbedded in said pipe ends so as to abut together endwise, each collar having an annular groove adjacent to its free end, an annular sheet metal member having a medial fold to render the same longitudinally expansible and side flanges to respectively engage in the grooves of the respective abutting ends of said collars so that said sheet metal member covers the joint intermediate the abutting ends of the latter, the outward side wall of each collar groove being undercut, and a packing element calked into said grooves against said flanges to bend and seal the same against and beneath said undercut side walls of said collar grooves, said packing elements comprising substantially tubular metallic casings having a central core of fibrous material.

In testimony, that I claim the invention set forth above I have hereunto set my hand this 17th day of June 1926.

FRANCIS H. SHERRERD.